UNITED STATES PATENT OFFICE.

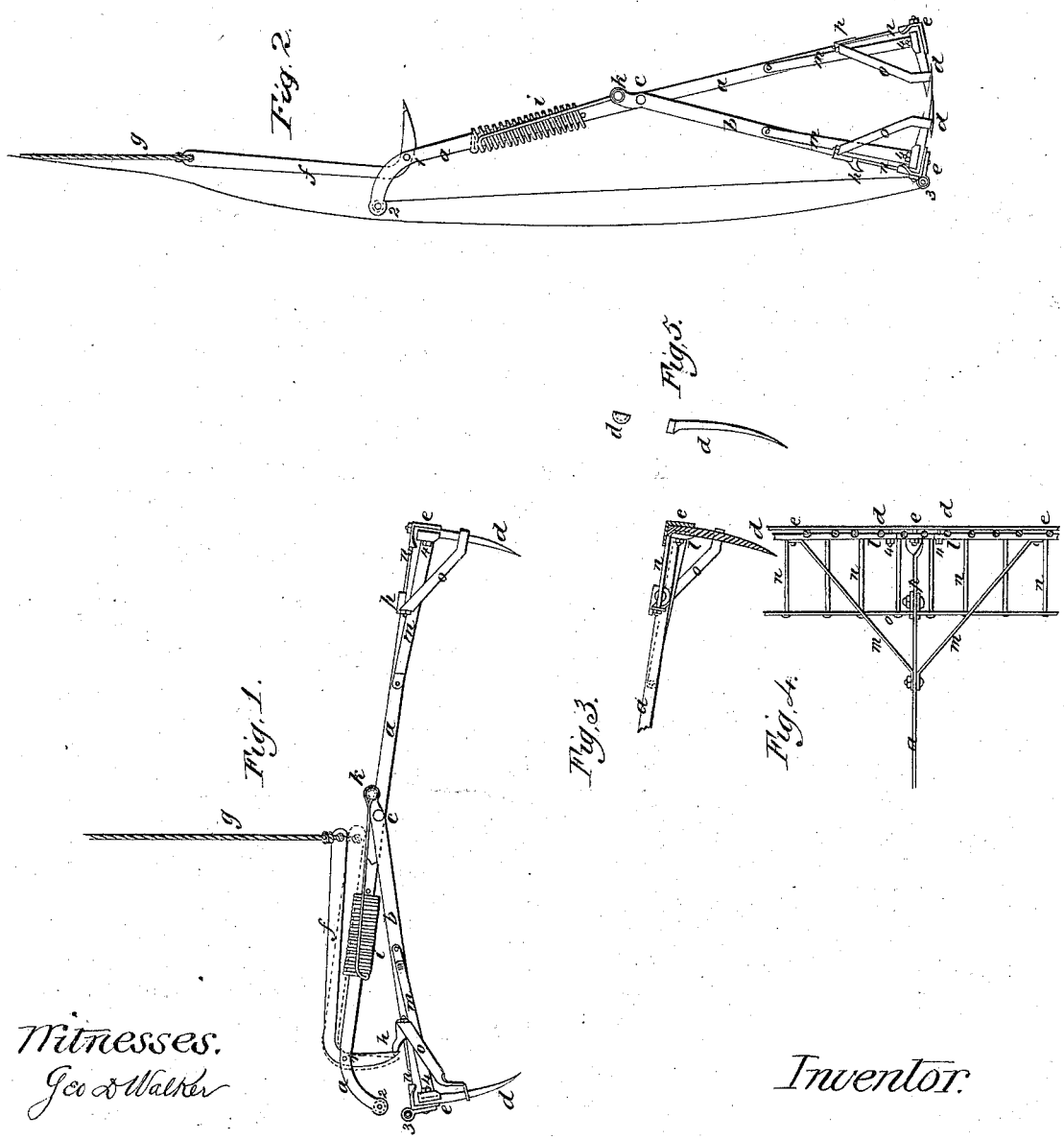

JOB JOHNSON, OF BROOKLYN, NEW YORK.

IMPROVEMENT IN OYSTER-RAKES.

Specification forming part of Letters Patent No. 58,426, dated October 2, 1866.

*To all whom it may concern:*

Be it known that I, JOB JOHNSON, of Brooklyn, in the county of Kings and State of New York, have invented, made, and applied to use a certain new and useful Improvement in Submarine Rakes for Oysters, &c.; and I do hereby declare the following to be a full, clear, and exact description of the said invention, reference being had to the annexed drawings, making part of this specification, wherein—

Figure 1 represents the rake in position for lowering to the bottom of the water. Fig. 2 represents the rake as closed, ready for being drawn up. Fig. 3 is a section showing the mode of securing the rake-teeth; and Fig. 4 represents the braces and clips uniting the handle and head carrying the rake-teeth.

Similar marks of reference denote the same parts.

My invention consists in a pair of metal rakes united by bars or handles and fitted with a lever-catch, to which the rope or chain is affixed for lowering and raising the rake. Said catch disconnects by its own weight when the apparatus touches the bottom, and the rakes are drawn gradually together, inclosing the oysters, clams, or other things that may be between said rakes, and the hoisting-rope draws the apparatus to the surface.

By this device oysters can be gathered in waters that are too deep to employ the ordinary oyster-rake; and the apparatus may be employed in the pearl-fisheries, in gathering sponge, or wherever available.

In the drawings, $a$ and $b$ are bars, united at $c$ by a bolt or rivet, and forming the handles of the rakes $d\ d$, that are affixed to the ends of these handles, being composed of any desired number of teeth set in a head, $e$, at right angles to said handles, and of suitable length for the intended purpose. The handle $a$ is extended beyond the hinge $c$ and receives the bent lever $f$ on a fulcrum, 1, to the long end of which lever $f$ the actuating rope or chain $g$ is attached. The short end of said lever $f$ has a recess or notch taking the catch $h$.

$i$ is a spring around $a$, with one end attached at $k$ to the end of the handle $b$, so that the spring tends to draw the rakes together. A spring of any other character, however, may be employed, and in some cases the spring $i$ may be dispensed with.

The apparatus hangs nearly evenly balanced from the rope $g$, and the weight of the rakes causes the catch $h$ and notch in $f$ to remain in contact and hold the rakes apart, as seen in Fig. 1; but when the apparatus rests at the bottom of the water the long end of the lever $f$, descending, as seen by red lines, unlatches the catch $h$, and the rake teeth penetrate the sand or mud, raking together the oysters or gathering anything that may be between the rakes as they gradually close together by the action of the spring $i$ or by the pulling up of the cord, rope, or chain $g$, the position of the parts when closed being shown in Fig. 2.

Should the apparatus be employed where it may become entangled in or grasp a rock, log, stone, or other article that could not safely be raised by it, a second line is to be passed through eyes at the side of the first line and go through double or single pulleys at 2 and 3, so that by pulling on this line the rake can be opened to disconnect it from an obstruction. The direction of this line for opening the rake is indicated by the red lines in Fig. 2.

The rake-teeth are made separately and secured in the head $e$ by suitable means. I prefer and use the clamping-segments $l\ l$, that are notched on the under side to set over the teeth and also over a head that is forged at the end of each tooth, as seen in Fig. 3, and the head being filed away or removed on one side, as seen in the detached view, Fig. 5, there is one flat side that sets against the inside of the rake-head $e$ and prevents the tooth turning. The sections $l\ l$, for clamping the teeth, may include two or more teeth and be secured by a bolt and nut at 4, so that one or more teeth can be taken out with facility for straightening or for replacing a broken tooth.

The ends of the handles $a$ and $b$ are twisted, so as to set flat against the insides of the angular bar forming the rake-head $e$, and to which they are riveted. I also provide diagonal braces $m\ m$, extending from the sides of said handles to the upper surfaces of the clamping-segments, where they are bolted or riveted to place.

I provide inclosing-fenders $n\ n$, extending up from the head of the rake, the bars of which set into notches in the inner edges of the segments $l$, and the upper ends of said bars are riveted into the bar o. These bars are connected to the handles a and b, respectively, by the clip p and by the clip portion of the catch k. The ends of these bars o are bent down and attached to the end teeth of the rake in any convenient manner, either by a clip or by a hole through which the tooth passes.

I prefer that the end teeth be bent with the rear end extending up to the bar o, where they are attached by nuts or riveting.

I have described the mode of constructing the parts somewhat in detail, so as to show the simplest and strongest modes of forming the rakes entirely of metal, for insuring great strength and lightness and giving facility for repairs.

The ends of the rakes may be additionally protected by teeth or fingers standing inward, so as more securely to retain whatever may be gathered by the rakes.

This apparatus will be strongest when made entirely of metal, but I do not limit myself in this particular; and rings or holes may be substituted for pulleys at the parts 2 and 3.

What I claim, and desire to secure by Letters Patent, is—

1. The lever, in combination with a pair of rakes hinged together, substantially as specified, for keeping the rakes apart as they are lowered and allowing the rakes to close after they touch at the bottom of the water, as set forth.

2. A line or cord passing from the end of one handle to the rake on the other handle, for opening the rake when it becomes necessary to disconnect the same from any article in the water, as specified.

3. The mode of constructing the metallic rake-head, with the angle-iron receiving the teeth clamped to the same, substantially as set forth.

4. The metallic fenders formed of the bars o and rods n, the parts being united to the rake-head e in the manner specified.

In witness whereof I have hereunto set my signature this 19th day of July, 1866.

JOB JOHNSON.

Witnesses:
 GEO. D. WALKER,
 HAROLD SERRELL.